INVENTORS
Richard BUTLER
Vincent SAULL
Kevin DWYER

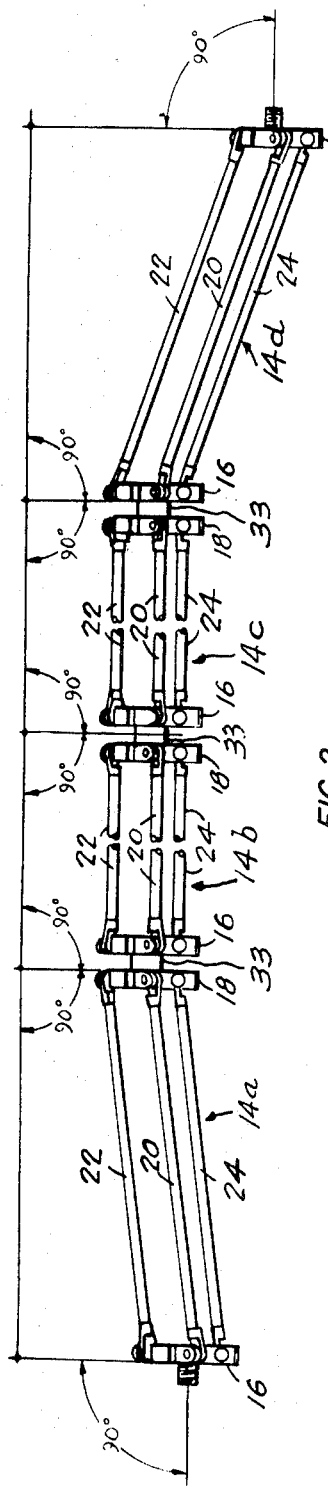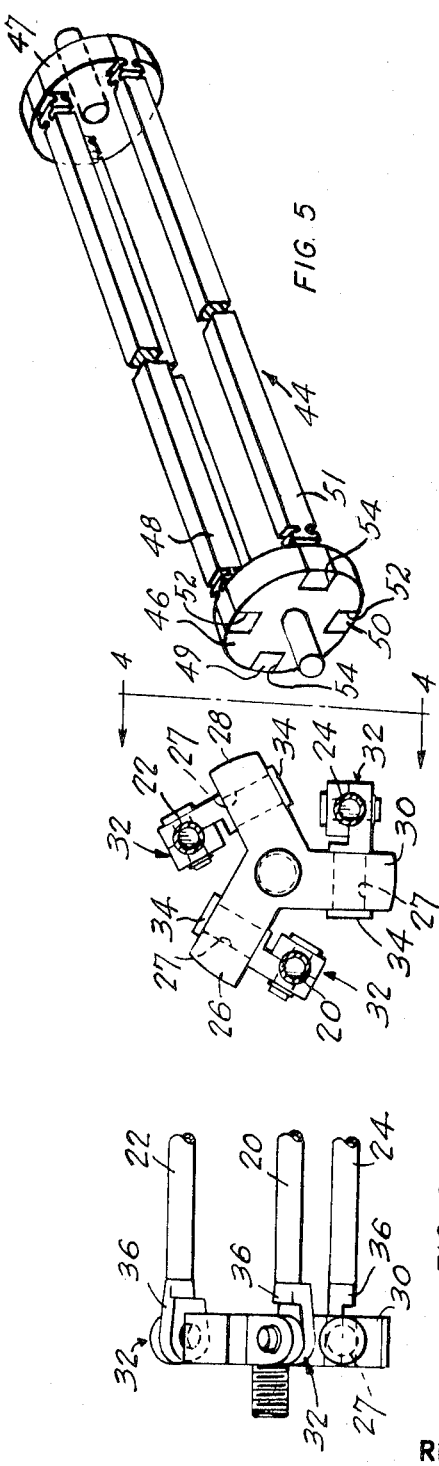
INVENTORS
Richard BUTLER
Vincent SAULL
Kevin DWYER
*Alan Swabey*
ATTORNEYS United States Patent Office 3,611,581
Patented Oct. 12, 1971

3,611,581
BORE SURVEY INSTRUMENT
Richard Butler, 5679 Edgemore Ave., Cote St. Luc, Quebec, Canada; Vincent Saull, 1 6th St., Roxboro, Quebec, Canada; and Kevin Dwyer, Gardenvale Road, St. Bruno, Quebec, Canada
Filed Apr. 21, 1969, Ser. No. 817,937
Int. Cl. E21b 47/02; G01c 9/00
U.S. Cl. 33—205 R                                              9 Claims

ABSTRACT OF THE DISCLOSURE

A parallelogram device for maintaining or surveying the dip or azimuth of a bore hole, drill hole, pipes and the like including a plurality of detachable units wherein each unit has a pair of platforms in parallel relationship, a plurality of rods pivoted to each platform maintaining parallelogram structure of each unit.

BACKGROUND OF INVENTION

(1) Field of invention

The present invention relates to bore survey instruments and particularly to an instrument from which the azimuth and dip of a particular portion of a bore can be determined. The word bore relates to any elongated hollow cavity, such as a drill hole, pipe, and a well, etc.

(2) Description of prior art

It is well known that in drilling bore holes, the drill string or stem tends to wander from the predetermined axis taken through the collar of the bore hole. This wandering or deviation is influenced by rock or ground formations, length of the bore hole and so on. Therefore, in order to accurately map the bore hole, it is of utmost importance that some survey means be provided for periodically surveying the progress and location of the bore hole relative to the bore hole collar.

Heretofore, many devices have been developed, with varying degrees of success, to survey bore holes by determining the dip or inclination of the hole and its azimuth. The means for measuring the dip of the bore hole, using various gravitational devices are relatively successful. However, in attempting to measure the azimuth of a bore hole, many problems have been encountered. The most common method is to suspend a compass in the bore hole, with suitable locking means and then reading the compass when it has been retrieved from the bore hole. However, if the bore hole is in or near a zone of mineralization in which pyrhotite or other iron bearing minerals are found, the magnetic compass can be easily influenced and diverted from the magnetic north.

It is an aim of the present invention to provide an apparatus for determining both the dip and azimuth of the hole in one operation and using simple mechanical means which are not influenced by foreign magnetic, or electrical, fields.

A construction in accordance with the present invention comprises a bore survey instrument for determining the dip and azimuth of a bore. The instrument comprises a bore string with a leading end and a trailing end. At least a portion of the leading end includes first and second spaced-apart planar members and means connecting the first and second planar members together so that the planar surfaces are parallel through any degree of movement. Pilot means are mounted normal to said first planar member and adapted to assume the direction of the bore hole, while similar indicating means are connected normal to the second planar member for indicating at the surface the direction assumed by the pilot means as the instrument is lowered in the bore hole.

A more specific feature of the present invention is that the means connecting the first and second planar members may include a plurality of units with each unit comprising a pair of spaced-apart planar members one at each end of a unit. Each unit planar member being connected to the other by at least three noncentric spaced-apart longitudinal members of equal length, whereby the planes of said unit planar members remain parallel through any degree of movement. The planar member at the leading end of the bore hole string is a unit planar member of the first unit at the leading end, and the pilot means is connected normal to this unit planar member.

BRIEF DESCRIPTION OF THE DRAWINGS

Having thus generally described the nature of the invention, particular reference will be made to the accompanying drawings, showing by way of illustration, preferred embodiments thereof, and in which:

FIG. 2 is an enlarged fragmentary view of a portion of the apparatus according to one embodiment;

FIG. 3 is an end view of one of the units shown in FIG. 2;

FIG. 4 is a side elevation taken along line 4—4 of FIG. 3;

FIG. 5 is a perspective view of a further embodiment of the unit which can be used in the apparatus shown in FIG. 1.

Figure 1:
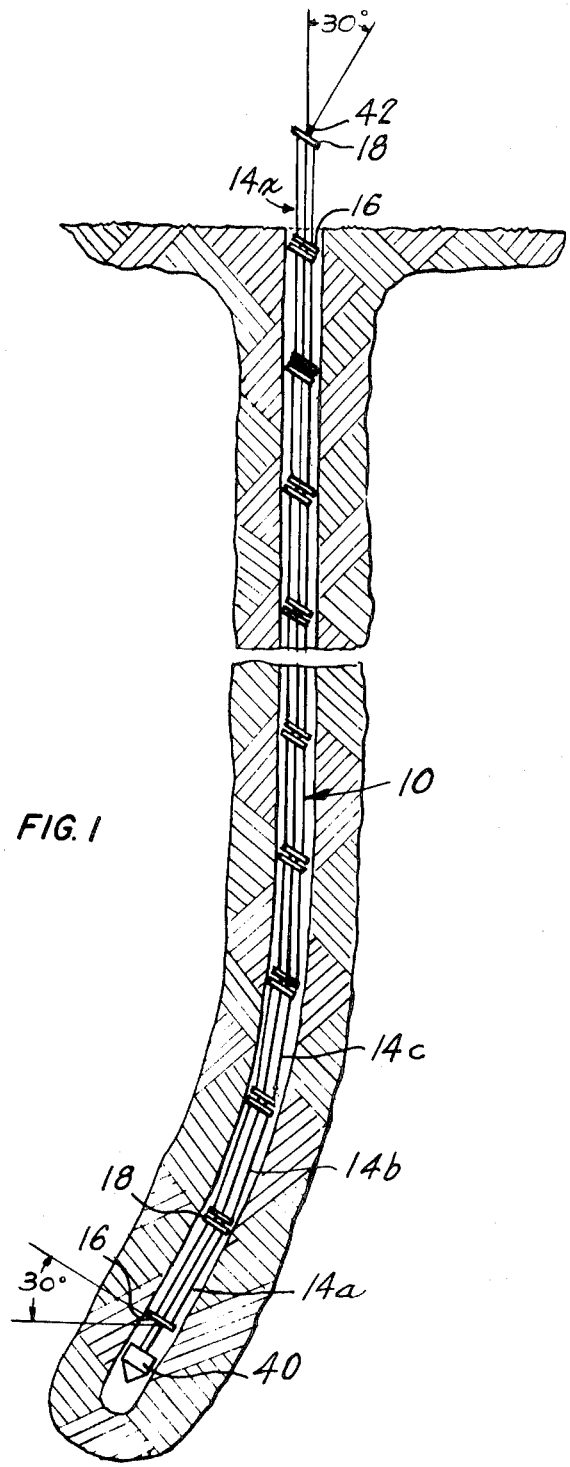
FIG. 1 is a diagrammatic view in vertical section of a bore hole which has been enlarged in diameter.

Referring now to the drawings, and particularly to FIGS. 1 through 4, the embodiments shown include a continuous bore hole string 10 made up of a plurality of units 14a, 14b, 14c . . . 14x.

Each unit 14 includes, as shown in FIGS. 2 through 4, an end platform 16 and 18, spaced apart and connected by three link rods 20, 22 and 24.

Each platform 16 and 18 includes three outwardly-directed platform arms 26, 28 and 30, to which the link rods 20, 22 and 24 are connected respectively.

Each arm 26, 28 and 30 includes a bore defined in the arm tangential to the common circle taken through the three arms. The link rods 20, 22 and 24 each include a pivoted connecting member 32, which comprises a shank portion journalled in the bore 27. An adaptor portion 36 is connected directly to the link arm and is pivoted to the portion of the shank 34 which extends outwardly of the bore 27.

Referring now to FIG. 1, which includes the bore hole string 10 made up of a plurality of units 14 as above described, the foremost unit 14a at the leading end of the bore hole string includes a pilot head 40 which is fixedly secured to the platform 16 of unit 14a. The axis of the pilot means is normal to the plane of the platform 16. At the trailing end of the bore hole string 10 is an indicating means 42 which is mounted normal to the end platform 18 of a unit 14x.

Each unit 14 is geometrically a spacial parallelogram. In other words, since the link rods 20, 22 and 24 are all of constant length and are all pivotally connected to the platform 16 and 18, these platforms will remain in parallel spacial relationship, no matter what direction the spacial parallelogram or unit 14 is collapsed. Since each unit 14a, 14b, 14c . . . 14x is fixedly connected platform 18 to platform 16, the parallel spacial relationship of the platforms will be maintained. For instance, in a bore hole, platform 16 following the direction imposed to it by the pilot head 40, will transmit the new direction to the platform 18 of unit 14a which will remain parallel thereto and since platform 16 of unit 14b is fixedly connected to platform 18, thus the new platform 16 will be parallel to platform 16 of unit 14a, and so on. In other words, depending on the direction taken by the pilot head 40 at the leading end of the bore hole string, the indicating means 42 at the trailing end of the bore hole string 10 will be in exact spacial parallel relationship as to direction. From the direction at which the indicating means 42 is pointing at the trailing end of the bore hole string 10, the azimuth and dip of the pilot head at the leading end of the bore hole string 10 can be easily determined by taking into consideration, the length of bore hole string 10, that is, extending in the bore hole.

FIG. 4 illustrates another embodiment of the unit which can be used and which is particularly suitable to resist torsional forces. In FIG. 5, the unit 44 is shown as having end platforms 46 and 47 and four link rods 48, 49, 50 and 51. The end of the link rods 48, 49, 50 and 51 are set in the platforms 46 and 47 as is shown in the drawings. Spaced from the end of the link rods 48–51 are pairs of opposed slots 52 and 54 which are at right angles to each other, and which provide for the articulation of the rods 48–51.

For instance, it has been contemplated that a unit could be used wherein the end platforms could be of different sizes or diameters. In this case, assuming the links are of equal length, the platforms would be parallel only when the complete assembly is straight. Of course, the longitudinal link rods would never be parallel. Such a unit would have the property of multiplying or dividing the angle between the end platforms of standard units immediately adjacent it. The ratio of the multiplication could be computed. Of course, only one of these units would be used at predetermined locations in a normal assembly so that the angular variation of the device could be increased. The azimuth transfer would be unchanged.

It has also been contemplated that an embodiment could have three non-centric longitudinal members whose ends were fixed and a fourth central member. The fourth central member could be replaced by a tube surrounding the unit. For instance, such a unit would include a pair of end platforms, discs with a central ball-joint mast connected to the disc for universal movement, and the other non-centric members joining the corresponding discs at their circumferences could be flexible, such as piano wire members.

The above embodiments have been mentioned as being used in drill holes which have both dip and azimuth. However, it is contemplated to use the structure to survey pipes, sewage drains and so forth. It is also contemplated to use the structure for guiding a downhole drill. That is where the drill motor means and the drill head are attached in the place of the pilot means and are adapted to be at the bottom of the drill hole. The structure of the present invention could be used to guide the direction of the downhole unit.

We claim:

1. A bore hole survey instrument for determining the dip and azimuth of a bore hole comprising a bore hole string with a leading end and a trailing end, at least a portion of said string at the leading end including a first planar member articulated with the string and a second spaced-apart planar member articulated at the trailing end, said string connecting said first and second planar members together so that their planar surfaces remain parallel when they are moved, pilot means mounted normal to said first planar member to follow the bore hole and means connected to said second planar member for indicating at the mouth the direction assumed by the pilot means as the instrument is lowered in the bore hole.

2. A bore hole survey instrument as defined in claim 1, wherein said string connecting the first and second planar members together so that their planar surfaces are parallel through any degree of movement comprises a plurality of units, each unit comprising a pair of spaced-apart flat planar members one at each end of the unit, each unit planar member being connected to the other by at least three non-centric spaced-apart longitudinal members of equal lengths.

3. A bore hole survey instrument as defined in claim 2, wherein the longitudinal spaced-apart members connecting the unit planar members are connected on three corresponding points of each planar member by universal connecting means allowing universal pivoting movement of the longitudinal members relative to the planar members.

4. A bore hole survey instrument as defined in claim 2, wherein there are four longitudinal members in each unit and the four longitudinal members are connected at four spaced-apart points about the periphery of the spaced-apart planar members for universal pivoting movement therewith.

5. A bore hole survey instrument as defined in claim 2, wherein planar members of adjacent connected units are rigidly connected to each other.

6. A bore hole survey instrument as defined in claim 2, wherein the first planar member is a unit planar member of a unit at the leading edge of the bore hole string, while the second planar member is a planar member at the free end of the unit at the trailing end of the bore hole string.

7. A bore hole survey instrument comprising segments forming a bore hole string with a leading end and a trailing end, a first planar platform means provided at the leading end of the bore hole string and a second planar platform provided at the trailing end, pilot means fixed normal to the plane of the first platform means at the leading edge of said bore hole string to assume the axis of a given portion of a bore hole, the first and second platform means being connected by an articulated parallelogram linkage means for pivoting about two perpendicular axes of freedom whereby the linkage means can pivot about the said two axes and thus the planes of said platform means are maintained parallel as the direction of said pilot means changes as it follows the direction of the bore hole; and indicator means on the second platform at the trailing end of a bore hole string thereof for indicating the dip and azimuth of the pilot means and thus the bore hole at said given portion.

8. A bore hole survey instrument comprising a bore hole string, including a leading end and a trailing end; said string including a portion of the string at the leading end thereof which comprises an articulated unit including a pair of spaced-apart platforms, one at each end of the unit, each platform being connected to the other by at least three non-centric spaced-apart longitudinal members of equal length, whereby the planes of said platforms remain parallel; elongated pilot means connected normal to the platform of the unit at the leading end of the string, whereby the axis of the pilot means will coincide substantially with the axis of any given portion of the bore hole, and indicator means at the trailing end thereof for indicating the dip and azimuth of the pilot means in the bore hole.

9. A bore hole as defined in claim 8, wherein the bore hole string comprises a plurality of said units, the platform at the unit at the leading edge of the string mounting the pilot means, and the indicator means being mounted on the free platform of the last unit on the trailing end of the string, at the mouth of the bore hole.

References Cited

UNITED STATES PATENTS

| | | | |
|---|---|---|---|
| 2,600,201 | 6/1952 | Brundage et al. | 33—25 C |
| 2,615,255 | 10/1952 | Rankin | 33—174 N |
| 3,038,261 | 6/1962 | Blain | 33—180 A |

LEONARD FORMAN, Primary Examiner

S. L. STEPHAN, Assistant Examiner

U.S. Cl. X.R.

33—204 R